United States Patent [19]
Mita

[11] Patent Number: 5,006,938
[45] Date of Patent: Apr. 9, 1991

[54] HALF-TONE IMAGE GENERATOR USING WHITE NOISE SOURCE

[75] Inventor: Kikuo Mita, Tokyo, Japan

[73] Assignee: Eastman Kodak Company, Rochester, N.Y.

[21] Appl. No.: 458,018

[22] Filed: Dec. 28, 1989

[30] Foreign Application Priority Data

Sep. 5, 1989 [JP] Japan .................................. 1-230706

[51] Int. Cl.⁵ ............................................ H04N 1/40
[52] U.S. Cl. ..................................... 358/466; 358/465; 358/455
[58] Field of Search ............... 358/454, 465, 466, 160; 382/53

[56] References Cited

U.S. PATENT DOCUMENTS

| | | | |
|---|---|---|---|
| 3,911,212 | 10/1975 | Yoshizawa et al. | 358/465 X |
| 3,965,290 | 6/1976 | Tisue | 358/466 X |
| 4,234,895 | 11/1980 | Sommer et al. | 358/466 |
| 4,399,461 | 8/1983 | Powell | 382/53 X |
| 4,908,875 | 3/1990 | Assael et al. | 358/466 |
| 4,912,569 | 3/1990 | Petilli | 358/466 X |
| 4,918,543 | 4/1990 | Petilli | 358/454 X |

FOREIGN PATENT DOCUMENTS

| | | | |
|---|---|---|---|
| 3201448 | 8/1982 | Fed. Rep. of Germany | 358/454 |
| 56-141667 | 11/1981 | Japan | 358/454 |
| 57-5466 | 1/1982 | Japan | 358/465 |

Primary Examiner—James J. Groody
Assistant Examiner—Mark R. Powell
Attorney, Agent, or Firm—Raymond L. Owens

[57] ABSTRACT

A half-tone binarization generator that produces high-quality half-tone binarization images by converting multilevel brightness information into sets of black and white bitonal data by adding noise to the multilevel brightness information and using a thresholding technique.

3 Claims, 3 Drawing Sheets

FIRST EMBODIMENT

FIRST EMBODIMENT

NOISE GENERATOR CIRCUIT

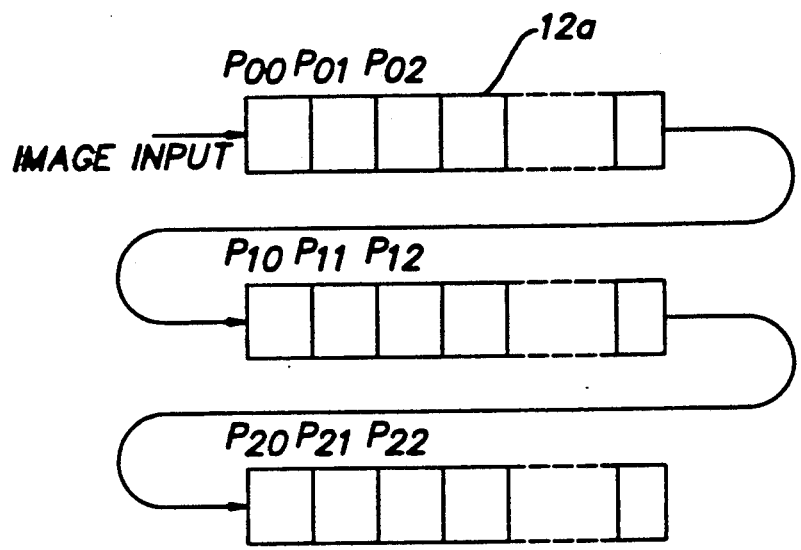
LOW-FREQUENCY FILTER
FIG. 3A
LOW-FREQUENCY FILTER
FIG. 3B
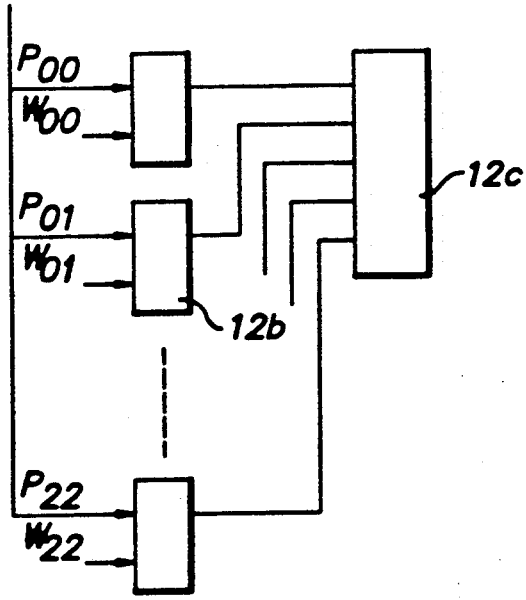
LOW-FREQUENCY FILTER
FIG. 3C

SECOND EMBODIMENT

HALF-TONE IMAGE GENERATOR USING WHITE NOISE SOURCE

BACKGROUND OF THE INVENTION

1. Field of the Invention

The present invention relates to a half-tone image generator, and particularly to a generator capable of low-cost, rapid generation of a pseudo-representation of the tones of a multitone image as sets of black and white bitonal data.

2. Description of the Prior Art

The term "half-tone image generator" as used herein refers to apparatus that provides a pseudo-representation of the tones of multitone images as sets of black and white bitonal signal levels. Displaying black and white bitonal images simply by decreasing the number of tones results in the appearance of spurious contours, i.e., contours that are not present in the original image, producing a major degradation in the quality of the image. Dithering is a technique of de-emphasizing such spurious contours through the addition of noise.

Various dithering methods have been proposed corresponding to the number of tone levels or colors in a processed image. Ordered dithering and error diffusion are two of the principal methods used.

In ordered dithering, noise is added to multitone image data in the form of periodic signals. Error diffusion consists of using a given value to binarize multitone image data and utilizing a feedback of the difference between the original signal and the binarized signal to minimize error.

However, as ordered dithering uses the addition of noise in the form of a signal having periodicity, when a document printed using halftoning is scanned and utilized the ordered dithering, interference between the halftone pattern and the periodicity of the ordered dithering gives rise to a moire effect, a pattern of regular stripes that does not exist in the original document.

To a certain extent, error diffusion can depict shade tones naturally without the striped effect associated with ordered dithering. However, error diffusion involves real-time two-dimensional image processing, which requires complex, costly apparatus and increases the processing time.

SUMMARY OF THE INVENTION

In view of these problems with conventional half-tone image generators, an object of the present invention is to provide an improved half-tone image generator that is capable of providing high-quality half-tone image images through the rapid, low-cost conversion of multitone images into sets of black and white bitonal data.

To attain this object, the half-tone image generator according to the present invention comprises: noise generator means for generating noise; extraction means for extracting the high-frequency components from the noise generated by the noise generation means; adding means for adding the high-frequency noise received from the extraction means to a brightness information input; comparison binarization means for comparing the brightness information to which the high-frequency noise has been added by the adding means to a predetermined threshold value and providing a white or black level signal for output depending if the noise added brightness information is smaller or larger than the threshold value.

The above noise generator means is preferably arranged so that it produces white noise having an energy distribution in all of the frequency ranges. Memory means may also be provided to store the high-frequency noise in an arrangement whereby, when brightness information is input, the high-frequency noise is read out from the memory means and added to the brightness information.

The noise generation means and extraction means may be provided separately from the main apparatus, with the high-frequency noise being transmitted to the memory means via a communication means.

In contrast to the periodic noise generated by conventional systems, with the half-tone image generator thus configured according to the present invention, high-frequency noise is generated beforehand by the noise generation means and extraction means. Also, dithering is performed by the addition, by the adding means, of the high-frequency noise to the image data signals that are to be digitized.

Thus, during the binarization of image data signals to black or white levels or values by the comparison binarization means in accordance with a prescribed threshold value, as the high-frequency noise has no periodicity there is no moire effect arising from input signal interference, and high-quality half-tone image representation is therefore achievable.

The high-frequency noise added to the image data signals is generated upstream of the image processing. As this enables simple, low-speed processing circuitry to be employed without affecting image processing speed, the cost of the apparatus can be reduced.

Further features of the invention, its nature and various advantages will become more apparent from the accompanying drawings and the following detailed description of the invention.

BRIEF DESCRIPTION OF THE DRAWINGS

FIGS. 3A, 3B, and 3C are block diagrams of the low-frequency filter of the first embodiment.

DETAILED DESCRIPTION OF THE INVENTION

Figure 1:
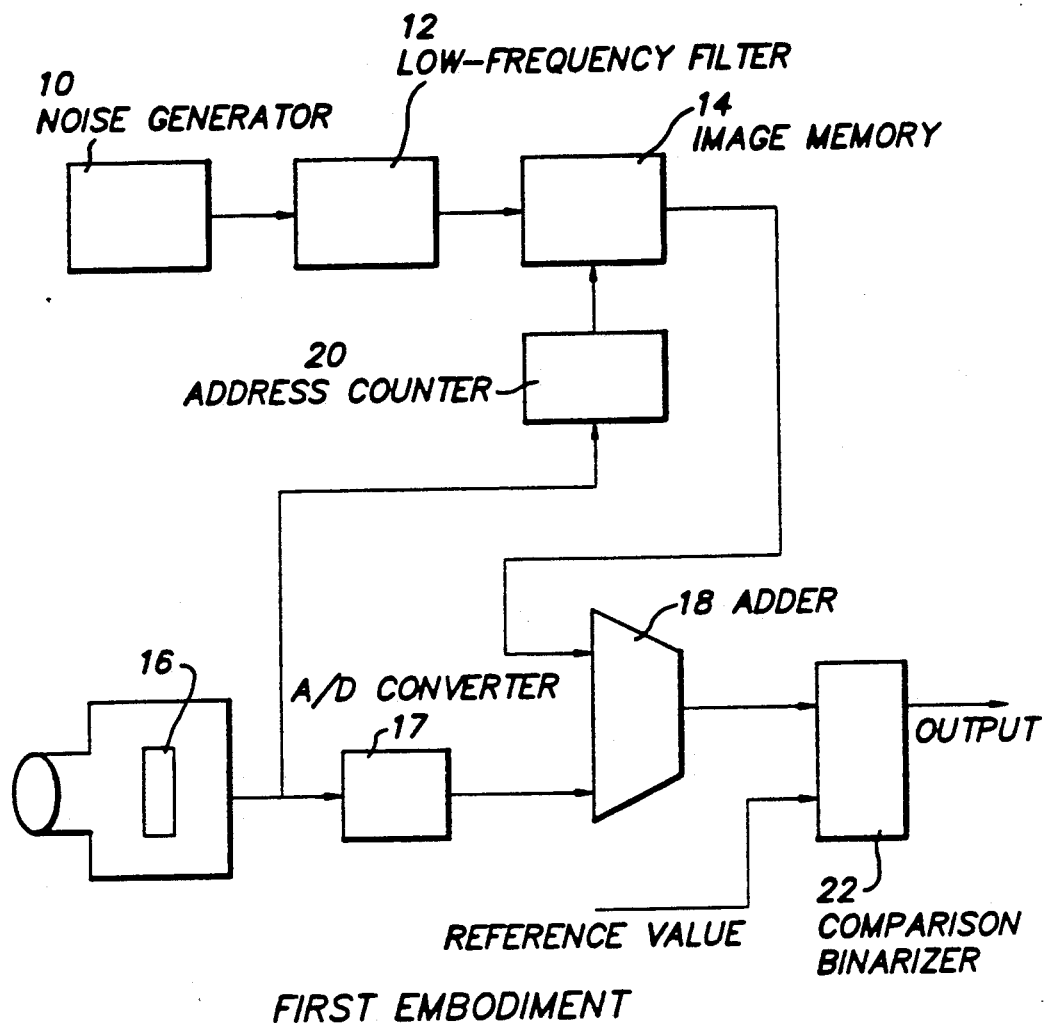
FIG. 1 is a block diagram of a first embodiment of the half-tone image generator according to the present invention.

FIG. 1 is a block diagram of a first embodiment of the present invention. With reference to the drawing, noise generated by a noise generator 10 is input to a low-frequency filter 12 that constitutes an extraction means to extract the high-frequency components. Noise from which the low-frequency components have been filtered out by the low-frequency filter 12 is stored in an image memory 14.

Figure 2:
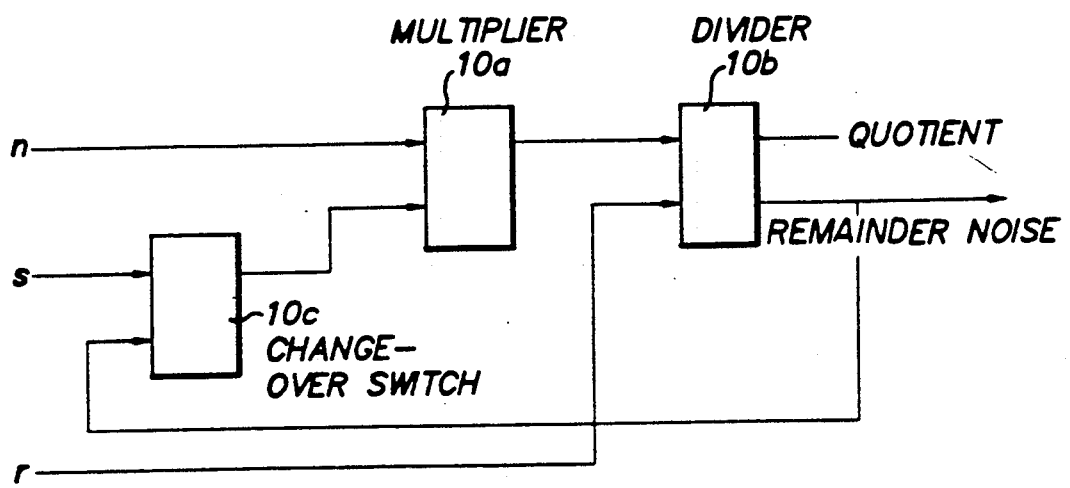
FIG. 2 is a block diagram of the noise generator used in the first embodiment.

The noise generator 10 will now be described, with reference to FIG. 2. FIG. 2 is a block diagram of the noise generator 10, which is constituted by a multiplier 10a, divider 10b and change-over switch 10c. When noise source s and prime number n are both input to the multiplier 10a, the multiplier 10a multiplies the two signals together and outputs the signal s * n.

The signal s * n output by the multiplier 10a is input to the divider 10b which divides the signal by a range r and outputs the remainder. The remainder is input to the change-over switch 10c, which outputs the remainder to the multiplier 10a in place of noise source s.

By sequentially changing the noise source and repeating the multiplication and division operations, the remainder output by the divider 10b is changed randomly, facilitating the provision of white noise having an energy distribution across all of the frequency ranges.

FIG. 3 is a block diagram of the low-frequency filter 12. Image data stored in a shift register 12a, shown in FIG. 3 (A), are sent to a multiplier 12b, shown in FIG. 3 (C), where each pixel is multiplied by the filter constant shown in FIG. 3 (B), and the sum of all the products is obtained by an adder 12c. The output signal OUT (M, N) therefore becomes OUT (M, N) $=\Sigma\Sigma D_{IN}$ (M $+X$, N$+X$) * W (X, Y) where $D_{IN}$(M $+X$, N $+X$) is the image data, W (X, Y) is the filter constant, M, N is the two-dimensional address of the image and X, Y is the two-dimensional address of the filter constant. By thus removing the low-frequency components, the high-frequency components can be extracted.

The noise from which the low-frequency component has been removed is stored in the image memory 14. Multitone image data picked up by an imager 16 and converted into electrical signals of varying strength are digitized by an A–D converter which produces multilevel image data signals or brightness information provided as an input to an adder 18. The image data signals from the imager 16 are also input to an address counter 20, and in accordance with the address counter 20 white noise signals corresponding to the input image data are sent to the adder 18.

The adder 18 adds a white noise signal to the image data signals and outputs the signals to a comparison binarizer 22. In the comparison binarizer 22 the image data signals to which white noise has been added are compared with a predetermined threshold value or level. When the image data signal is at larger value, a white level signal is output, and when the image data signal is at a smaller value, a black level signal is output.

In half-tone image produced in accordance with this embodiment, in contrast to the conventional systems, there is none of the moire effect that arises from input signal interference, so it is possible to obtain an image that is closer to the original image.

Thus, as in accordance with the present invention dithering is carried out with the addition of a non-periodic noise signal to the image signal, there is none of the spurious periodic stripe effect that arises with the conventional method, so high-quality half-tone image can be obtained. Moreover, as the noise added to the image data signals can be generated upstream of the signal processing, even when simple, low-speed processing circuitry is used for the noise generator 10 and the low-frequency filter 12, image processing speed is unaffected and the cost of the apparatus can be kept low.

Figure 4:
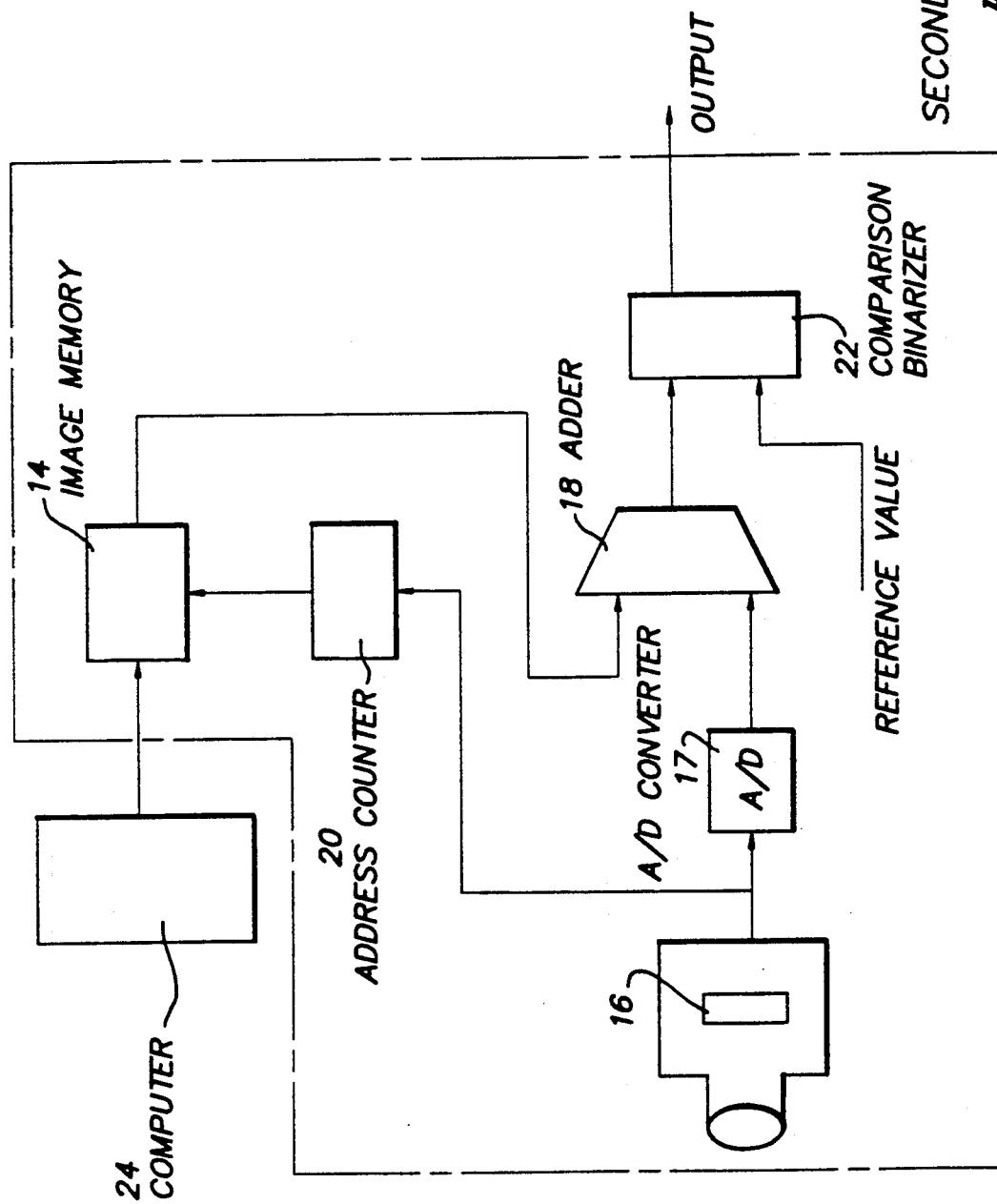
FIG. 4 is a block diagram of a half-tone image generator according to a second embodiment of the invention.

FIG. 4 is a block diagram of a second embodiment of the half-tone image generator according to the present invention. In this embodiment, a computer 24 performs the functions of the noise generator 10 and low-frequency filter 12 of the first embodiment. As in the first embodiment, from the computer 24, the noise from which the low-frequency components have been removed is stored in an image memory 14, and in accordance with an address counter 20 is sent to an adder 18 to add dithering to the image data or multilevel brightness signals.

By having the computer 24 perform the function of both the noise generator 10 and the low-frequency filter 12, the same type of high-quality half-tone image tones can be generated while at the same time the requisite circuitry can be simplified. A configuration may also of course be used where the computer 24 that generates the noise from which low-frequency components have been removed is located outside the main apparatus and a communication means used to transfer the high-frequency noise signals to the image memory 14.

With the half-tone image generator according to the present invention, multitone image data can be converted to black and white bitonal data sets quickly and economically, providing high-quality half-tone image tones.

The invention has been described in detail with particular reference to certain preferred embodiments thereof, but it will be understood that variations and modifications can be effected within the spirit and scope of the invention.

I claim:

1. A half-tone binarization generator whereby input multilevel brightness information is converted to represent the brightness information as black and white level signals, comprising:
   noise generating means for generating noise;
   extraction means for extracting high-frequency components from the noise generated by the noise generating means;
   adder means for adding the high-frequency noise from the extraction means to the multilevel brightness information;
   comparison binarization means for comparing brightness information to which the high-frequency noise has been added by the adder means with a predetermined threshold value and providing a black level signal or a white level signal depending if the noise added brightness information is smaller or larger than the threshold value.

2. The half-tone binarization generator according to claim 1 wherein the noise generation means generates white noise having an energy distribution in all of the frequency ranges.

3. The half-tone binarization generator according to claim 1 including a memory means for storing the high-frequency noise and wherein the added means adds the high-frequency noise from the memory means to the brightness information.

* * * * *